Oct. 13, 1953  H. E. McCRERY  2,655,012
FLEXIBLE SHAFT
Filed July 20, 1949
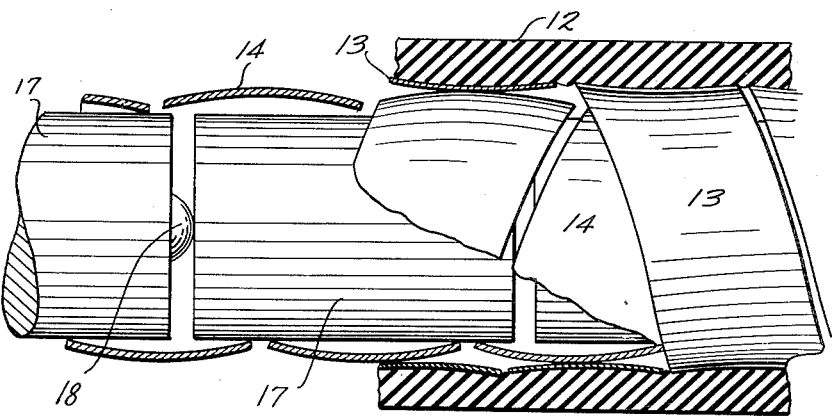
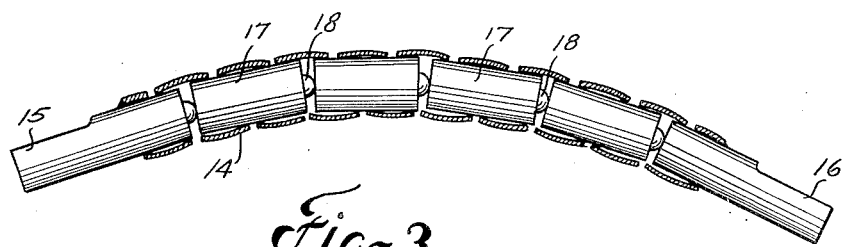
Inventor
Harold E. McCrery
Tom Walker
Attorney Patented Oct. 13, 1953

2,655,012

UNITED STATES PATENT OFFICE 2,655,012

FLEXIBLE SHAFT

Harold E. McCrery, Dayton, Ohio, assignor to Master Vibrator Company, Dayton, Ohio, a corporation of Ohio Application July 20, 1949, Serial No. 105,851

7 Claims. (Cl. 64—2)

This invention relates to flexible shafts, and more particularly to one having a relatively solid core.

Such devices, as heretofore known, are ordinarily made of multiple, nested layers of coiled wire. They are, therefore, relatively difficult and costly to manufacture and there is no simple means of repairing a broken coil. Moreover, their capabilities for the transmission of power are limited. The required diameter of the shaft, and, therefore, the cost of the unit, rises in unfavorably high proportion with increase in required power transmission. The sudden imposition of a heavy load cannot be regularly sustained.

The object of the invention is to simplify the construction as well as the means and mode of operation of flexible shafts as disclosed herein, whereby such shafts may not only be economically manufactured, but will be more efficient and accurate in use, adaptable to a wide variety of uses, having relatively few parts and be unlikely to get out of repair.

A further object of this invention is to provide a flexible shaft capable of transmitting a powerful rotary impulse in relation to its size and weight.

Another object of the invention is to enable the shaft to sustain the imposition of suddenly applied loads.

A further object of the invention is to simplify repair procedure in a flexible shaft.

Still another object of the invention is to present a generally new type flexible shaft which is simple and inexpensive of construction and which can be readily and quickly assembled.

A still further object of the invention is to obtain substantial axial and transverse incompressibility in the core of a flexible shaft without inhibiting flexure thereof.

A still further object of the invention is to reduce to a minimum frictional resistance to movement of the core.

A further object of the invention is to provide a flexible shaft possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

In carrying out the above objects there has been evolved a practical embodiment of the invention, wherein a flexible shaft includes a spirally wound coil of a flat relatively broad strip of spring steel, opposed tip members to which the opposite ends of the coil are secured, and a train of disconnected steel slug elements filling the space within the coil between the tip members, the coil having a preformed transverse curvature to restrict friction between the coil and the slug elements and between the coil and its sheath or casing.

Referring to the accompanying drawing, wherein is found the preferred but obviously not necessarily the only form of embodiment of the invention, Fig. 1 is a side view of a flexible shaft in accordance with the instant invention, part of the outer casing being broken away to show the core unit;

Fig. 2 is a view of a portion of the shaft in longitudinal section, Fig. 2 being enlarged with respect to Fig. 1; and Fig. 3 is a view of the core unit in longitudinal section.

Fig. 4 is a fragmentary view, partly in section, of a modified construction permitting use of the core unit for either direction of rotation.

Like parts are indicated by similar characters of reference throughout the several views.

Referring to the drawings, a flexible shaft in accordance with the instant invention comprises a casing unit 10 in surrounding and protecting relation to a core unit 11, the core unit being rotatable relatively to the casing unit.

The casing unit is made up of a sheath 12 of rubber or rubber-like material which receives and confines a spirally wound flat metal strip or coil 13. The strip or coil 13 is flexible, being made of spring steel or the like, and is mounted within the sheath 12 by winding the strip until its diameter is substantially less than the inside diameter of the sheath. Holding the strip so tensioned, the sheath is drawn into surrounding relation to the strip, which, when released, expands into gripping contact with the internal wall of the sheath. The sheath 12 and coil 13 thus make up a unitary casing, the fixed relation between the parts being accentuated by a transverse curvature of the coil, formed therein during winding. The arrangement of the parts is such that the concave side of the coil 13 is presented to the sheath, pressing the side edges of the coil strip into the inner sheath wall.

The convex side of the coil 13 faces inwardly toward the axis of the casing and presents curved, spaced bearing surfaces for contact with the core unit 11. It may be further noted that the curvature of the strip 13 is such as to aid introduction of the core unit into the casing, there being no opportunity for the side edges thereof to block movement of the core into the casing.

The core unit 11 comprises a second coil 14 wound in a direction inverse to the direction of winding of coil 13. The coil 14 is a flexible, spirally wound, flat metallic strip made of spring steel or the like and capable of transmitting torsional forces. Prior to winding, the strip of coil 14 is preformed with a transverse curvature. Such curvature is maintained in the wound condition of the coil, the arrangement being such that the convex surface appears on the external side of the coil and the concave surface on the internal side. The relationship between the coil 14 and the coil 13, accordingly, is such that opposing convex surfaces are presented to one another for a substantially line contact between the coils.

The opposite ends of the coil 14 are secured, as by spot welding, to respective tip members 15 and 16. One of the tip members is connected to a source of rotary power while the other tip member is connected to the part or machine to be driven. The coil 14 transmits the applied torque from the first tip member to the other.

Supported within the coil 14, in end to end contacting relation, is a plurality of solid cylindrical slug elements 17. The forward end of each element 17 has a projecting spherical portion 18 of reduced diameter abutting the flat opposite end of the next adjacent slug element. The main bodies of the elements 17 thus are spaced from one another so as to offer no resistance to bending and turning motions of the coil 14. The series of elements 17 fill the space within the coil between the tip members 15 and 16, and so define an axially incompressible train precluding shortening of the shaft. Further, the train of elements 17 is in peripheral contact with the internal surface of coil 14 and so precludes transverse narrowing or collapse of the coil. Inasmuch as the inwardly facing surface of coil 14 has a concave shape, the side edges of the coil make a substantially line contact with the slug elements 17, reducing friction in such relative motion as may take place therebetween.

According to this construction and arrangement of parts, therefore, the coil 14 is supported against distortion and is enabled to transmit, instantaneously, a power load greater in proportion to size than flexible shafts heretofore known.

A feature of the invention resides in the ease of repair which is possible should a break occur in the coil 14. Upon removal of the core unit, the two ends of the coil, at the break, are simply spot welded to the underlying element 17. Such element, being freely rotatable, thereafter transmits the applied power from one end of the break to the other.

It will be understood that the slug elements 17 may be formed other than as here shown. They may, for example, be wholly spherical or cylindrical with spherical ends.

As shown in Fig. 4 the structure may be modified slightly by the addition of a supplemental coil to provide a universal core unit usable in either direction of rotation. The modified construction embodies the coil 14 and the enclosed slug elements 17, as shown in Fig. 2 and 3. The coil 14 is secured at its opposite ends to tip members similar to those shown in Fig. 3. There is, however, added to this particular form of core an additional coil 19, this coil being wound in reverse direction from the coil 14. The ends of the supplemental coil 19 are also secured to tip members (not shown) similar to those shown in Fig. 3.

With the double coil construction (coils 14 and 19) the core unit may be used for transmitting power in either direction of rotation, coil 14 transmitting torque in one direction of rotation, while coil 19 transmits the torque in the opposite direction of rotation. The slug elements 17, of whatever form, function as before described in that they prevent shortening of the core or collapse thereof under load. Should either of the coils 14 or 19 be broken, they can be repaired as previously explained, by being spot welded to the underlying element 17.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. A core member for a flexible shaft assembly, including end or tip members, a helically wound metallic strip connected at its opposite ends to said tip members, said strip being preformed to a condition of transverse curvature whereby the internal surface of the wound strip has a concave shape, and a plurality of cylindrical solid slug elements arranged in end to end contacting relation in the wound strip, said elements defining an axially incompressible train having peripheral line contact with the edges of said strip and end contact with said tip members.

2. A core member for a flexible shaft assembly, including end or tip members, a helically wound metallic strip connected at its opposite ends to said tip members, said strip being transversely curved, and a plurality of disconnected intercontacting solid slug elements filling the space surrounded by said wound strip between said tip members and of a diameter to make substantially line contact with said strip.

3. In a flexible shaft assembly, a core member including end or tip members, a helically wound metallic strip connected at its opposite ends to said tip members, said strip being preformed with a transverse curvature and wound for external presentation of the convex side thereof, a train of interconnecting incompressible elements filling the space between said tip members within said strip and in peripheral contact with the side edges of said strip, and a casing member including a second helically wound strip in surrounding relation to the first, said second strip being transversely curved and presenting a convex surface to said first strip for substantially line contact therewith.

4. A core for a flexible shaft assembly, including a pair of helically wound flexible metallic strips superposed one upon another, each of said strips being wound in opposite directions and capable of transmitting torsional forces in opposite directions of rotation, and incompressible filler elements supported within said wound strips to inhibit transverse collapse thereof, said filler means comprising a plurality of independent solid slug members in contact engagement with one another to achieve axial as well as transverse incompressibility.

5. A core for a flexible shaft assembly, including a pair of concentric reversely wound helically coiled flat metal strips, a pair of tip members secured to opposite ends of the said concentric strips, and a plurality of filler elements enclosed within the concentric strips, arranged in end to end contacting engagement intermediate the tip members with which the filler elements also have contact engagement.

6. A core for flexible shafts, including a helically wound flexible metallic strip, capable of transmitting torsional forces, and incompressible filler means supported within said wound strip to inhibit transverse collapse thereof, said filler means comprising a plurality of solid slug members disconnected but in contact with one another to achieve axial as well as transverse incompressibility, said wound strip being preformed with a transverse curvature and being wound to present the concave side thereof to said slug members for substantially line contact of the side edge thereof with said slug members.

7. In a flexible shaft, a core member including end or tip members, a helically wound metallic strip connected at its opposite ends to said tip members, disconnected and solid filler elements within said wound strip between said tip elements, and a casing member including a second helically wound strip in surrounding and contacting relation to the first and a rubber or rubber-like sheath receiving and confining said second strip, said first and second strips being transversely curved and inversely arranged as to their transverse curvature for substantially line contact with one another.

HAROLD E. McCRERY.

References Cited in the file of this patent

UNITED STATES PATENTS

| Number | Name | Date |
|---|---|---|
| 492,266 | Browne | Feb. 21, 1893 |
| 1,678,335 | Gaston | July 24, 1928 |
| 1,995,421 | Goldberg | Mar. 26, 1935 |

FOREIGN PATENTS

| Number | Country | Date |
|---|---|---|
| 13,017 | Great Britain | 1909 |